United States Patent Office 3,470,693
Patented Oct. 7, 1969

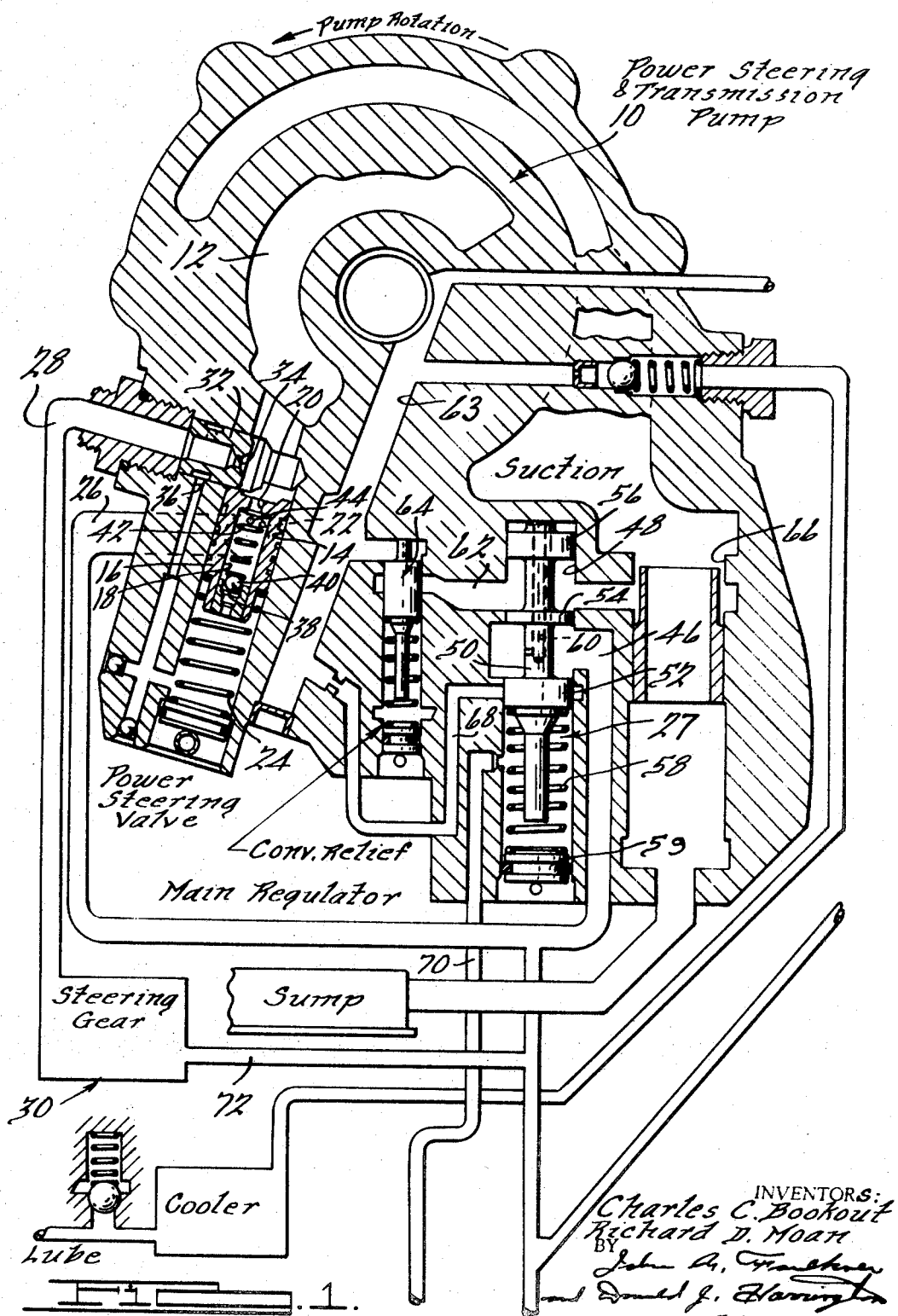

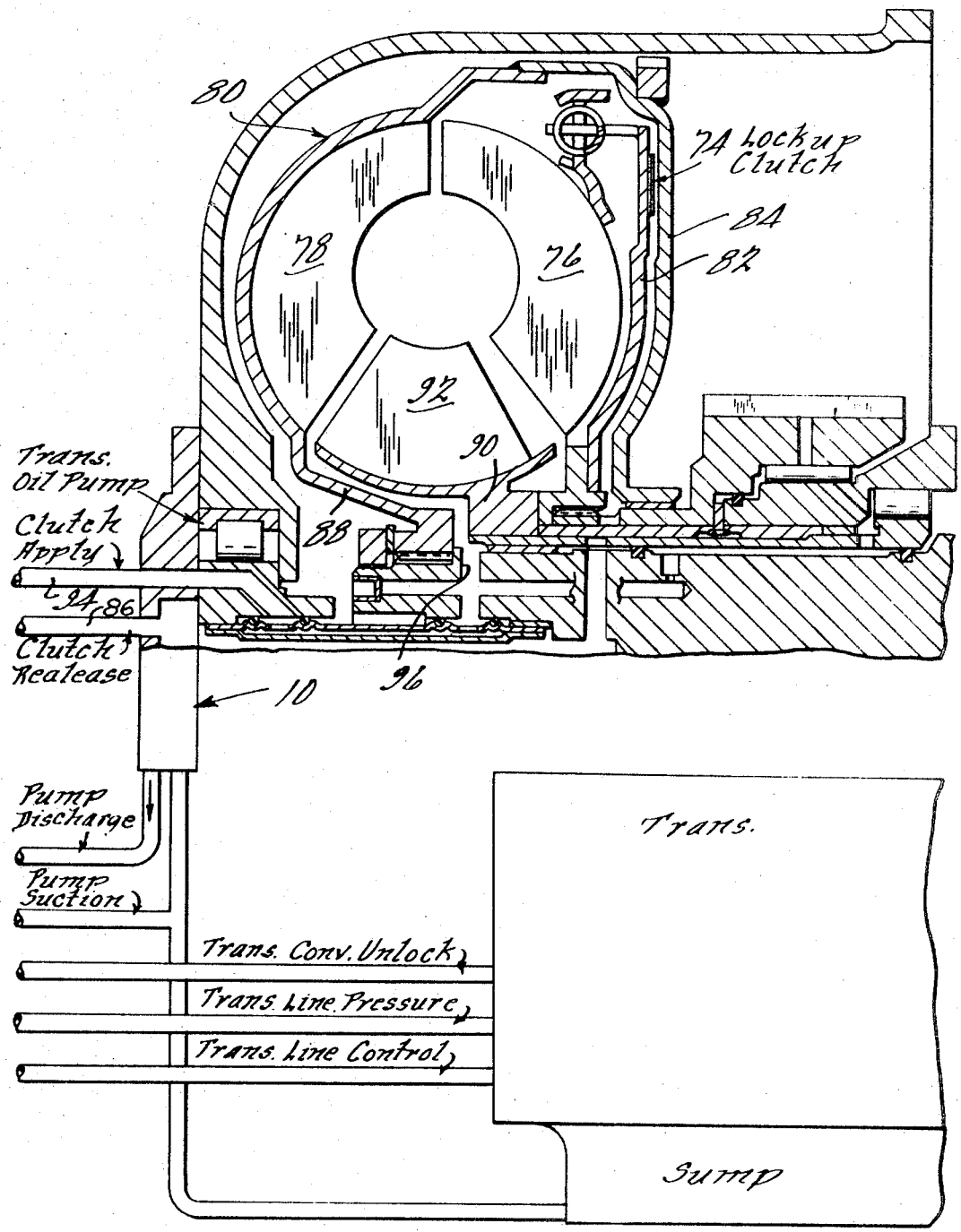

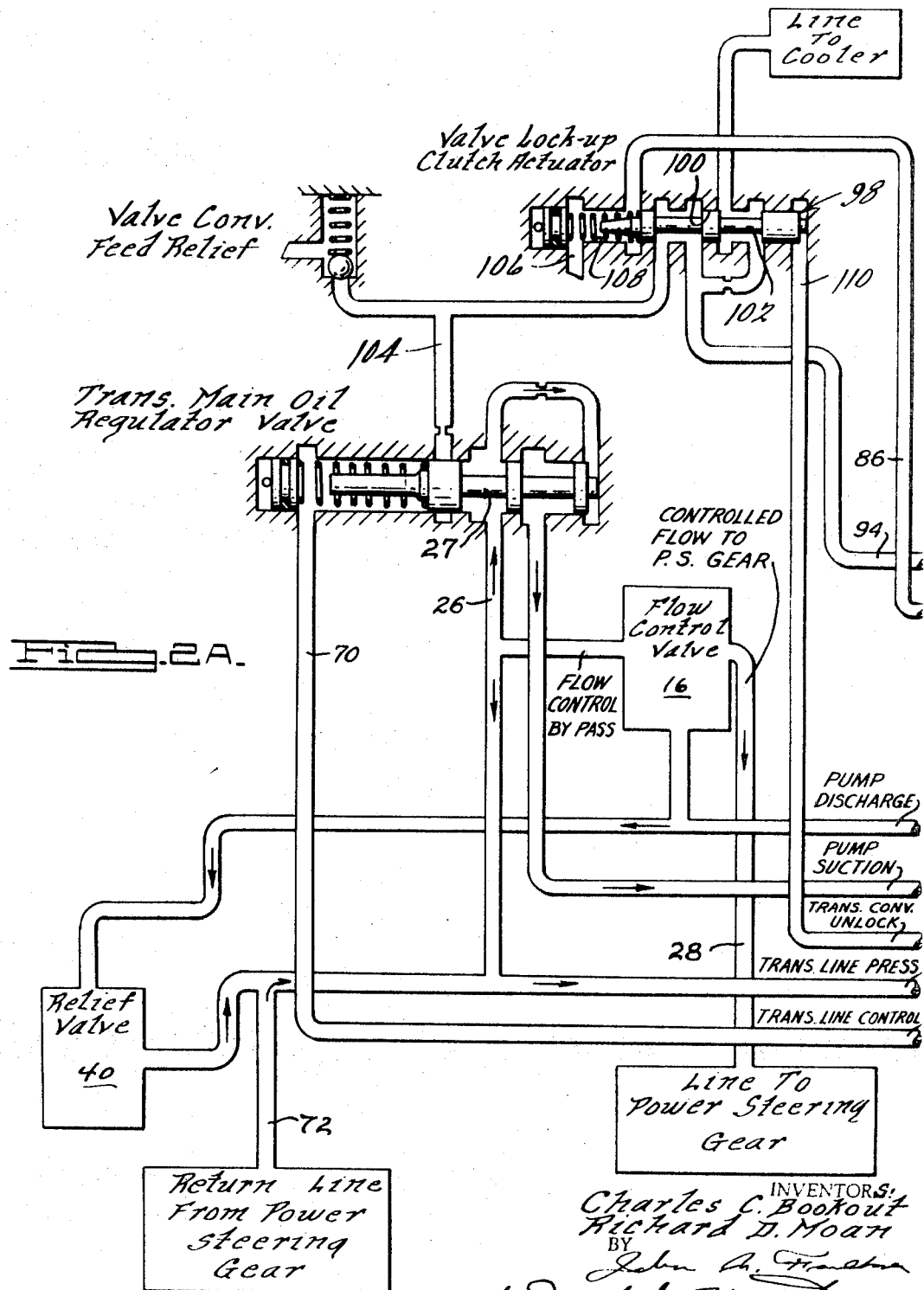

3,470,693
COMBINED HYDRAULIC SYSTEM FOR A VEHICLE TRANSMISSION MECHANISM AND POWER STEERING GEAR
Charles C. Bookout, Orchard Lake, and Richard D. Moan, Livonia, Mich., assignors to Ford Motor Company, Dearborn, Mich., a corporation of Delaware
Filed Dec. 28, 1967, Ser. No. 694,346
Int. Cl. F16h *41/06, 47/00*
U.S. Cl. 60—52       6 Claims

ABSTRACT OF THE DISCLOSURE

This specification describes a hydraulic circuit having a first portion that supplies fluid pressure to the clutch and brake servos of an automatic power transmission mechanism in a vehicle driveline and a second portion that supplies fluid pressure to a power steering gear for the vehicle. The circuit pressure for the transmission servos and the actuating pressure for the steering gear are developed by a common positive displacement pump driven by the vehicle engine. The hydraulic circuit is arranged so that the entire output of the posiitve displacement pump is distributed to the transmission control system while at the same time maintaining the pressure requirements for the power steering gear. The power steering gear as well as other hydrostatically operated accessories for the vehicle thus can be powered by a single transmission control pump that supplies also the transmission circuit requirements without increasing the size of the pump beyond the size that is necessary to maintain the flow requirements for the transmission system.

GENERAL DESCRIPTION OF THE INVENTION

It is prior art practice to provide automatic power transmission mechanisms in automotive drivelines with fluid pressure operated clutch and brake servos that control the application and release of friction torque establishing devices, which in turn control the ratio changes in the transmission gearing. The transmission control system is supplied by a positive displacement pump, which may be driven by the engine.

It is conventional practice also to include in the automotive vehicle chassis structure a steering system which includes a driver-controlled steering linkage for the dirigible vehicle wheels and a means for establishing a power assist for operating the dirigible wheels. The power assist is provided by a fluid pressure booster in the form of a fluid motor. An engine driven power steering pump normally is provided for supplying the booster with control pressure. Distribution of pressure to the power steering gear is under the control of a driver-operated valve assembly which responds to movement of the vehicle steering wheel.

My present invention eliminates the need for using two positive displacement pumps for performing these two separate functions. A common pump driven by the vehicle engine forms a part of the transmission control system as well as a persssure source for the power steering gear.

I am aware of certain prior art control systems having a central pressure source, which usually includes a pressure accumulator for supplying hydrostatically operated vehicle accessories (air conditioners, compressors, water pumps, alternator drives, power steering systems, etc.). The same central pressure source also supplies the transmission system. These require, however, a relatively large and costly positive displacement pump since the output capacity of the pump must meet the total of the separate capacities of the accessories and the transmission system.

The improvement of our invention eliminates this shortcoming in prior art systems by providing a control circuit that includes a common positive displacement pump for the power steering gear and other accessories as well as for the transmission system, wherein all of the output flow of the pump can be utilized by the transmission system while at the same time meeting the flow requirements of the steering gear.

BRIEF DESCRIPTION OF THE FIGURES OF THE DRAWING

FIGURE 1 shows in schematic form a portion of a hydraulic circuit for a power transmission system that is adapted to supply also the fluid flow requirements for a power steering gear in an automotive vehicle installation; and FIGURE 2 shows in schematic form a valve circuit which includes the valve element shown in FIGURE 1.

PARTICULAR DESCRIPTION OF THE INVENTION

In FIGURE 1, numeral 10 designates generally a positive displacement pump that is engine-driven. The pump may form a part of an automatic power transmission control system in an automotive vehicle driveline that includes an internal combustion engine and multiple ratio gearing. The gearing establishes plural torque delivery paths between the engine and the transmission drive shaft. The outlet port of the pump shown at 12 communicates with a power steering valve chamber 14 in which is situated slidably valve element 16. This is a single diameter valve element having a central opening 18 which communicates with the outlet port 12 of the pump 10 through flow restricting orifice 20.

A valve port 22 communicates with the chamber 14. It is adapted to be closed by the valve element 16 when the latter assumes the position shown in FIGURE 1. It normally is urged toward that position by the valve spring 24. Port 22 is in fluid communication with passage 26, which communicates with main regulator valve 27.

Port 12 communicates also with a pressure supply passage 28 for a power steering gear 30. This passage is defined in part by a fixed valve insert 32 which defines a flow-controlling orifice 34.

Fluid passing from the outlet port 12 of the pump 10 is distributed through the orifice 34 and through passage 28 to the steering gear. The upper end of the valve element 16 is subjected to pressure on the upstream side of the orifice 34. The downstream side of the orifice 34 is in fluid communication through passage 36 with the lower region of the valve chamber 14, which is occupied by the spring 24. This spring normally urges the valve element 16 in an upper direction which tends to seal the port 22.

One end of the opening 18 is formed with a ball check valve seat 38 against which is positioned ball check valve 40. This valve is urged into sealing engagement with the seat 38 by a valve spring 42. If the pressure on the downstream side of the orifice 34 should exceed a predetermined safe value, the valve 40 will open thereby short-circuiting the orifice 20 as fluid is passed through the valve seat 38 and through the bleed orifice 44.

Passage 26 communicates with the main regulator valve 28 at port 46. This port is situated in valve chamber 48 in which is received valve spool 50. Valve spool 50 includes spaced valve lands 52, 54 and 56 which register with internal valve lands formed in the chamber 48.

Valve spool 50 is urged in an upward direction, as viewed in FIGURE 1, by valve spring 58. This spring is seated on valve closure member 59. The upper side of the valve land 56 communicates with port 46 through internal passage 60. Pressure port 63 communicates with the torque converter feed port 62 through a converter pressure relief valve 64. Port 62 communicates also with an exhaust passage 66 which in turn is connected to the intake side of the pump 10.

The converter pressure feed passage 68 communicates with the valve chamber 48 at a location adjacent land 52. Fluid is distributed to the converter through passage 68 and the maximum pressure in the converter is determined by the relief valve 64. Any distribution of fluid to the converter that results in a pressure increase greater than the calibrated value for valve 64 will result in bypassing of the fluid into the exhaust passage 66.

The converter includes an impeller driven by the internal combustion engine of the vehicle driveline and a turbine situated in toroidal fluid-flow relationship with respect to the impeller. The turbine is connected to multiple ratio gear elements.

The region of the chamber 48 below the valve land 52 is in fluid communication with a line pressure boost passage 70. A control signal can be distributed to this passage in known fashion to modify the regulating characteristics of the valve 27 to meet varying torque delivery requirements. Any pressure in passage 70 will complement the valve regulating tendency of the spring 58.

When the vehicle is started, the pump develops a pressure in port 12. This results immediately in distribution of pressure to the passage 26 through the orifice 20. This pressure in turn is distributed to the main regulator valve, and a pressure build-up on the upper side of the land 56 takes place. Initially the valve land 52, after the spring 58 begins to deflect, will uncover passage 68 thereby causing fluid under pressure to be distributed to the converter feed passage 68. This occurs prior to the time that the land 54 uncovers port 62. After a predetermined pressure increase occurs in the converter and in other elements of the transmission system, land 54 will uncover the port 62 thereby establishing an upper limit for the regulated control pressure in the transmission system. When this occurs, the pressure drop across the orifice 34 is sufficient to cause the valve element 16 to shift against the opposing influence of spring 24 thereby uncovering port 22. Thereafter the pump is effective also to distribute pressure to the passage 26.

The pressurized fluid that is distributed to passage 28 passes immediately to the steering gear, where it is utilized in actuating the power steering servo. The fluid discharged from the steering gear is passed through passage 72 which in turn communicates with the intake side of the main regulator valve 27. All of the fluid that is transferred through the steering gear thus is utilized by the main regulator valve in supplying the requirements of the transmission system. The pumping capacity of the pump thus need not be increased although its output is used for supplying the power steering gear as well as the power transmission system.

Under some circumstances, it might be possible to supply fluid to other hydrostatically operated accessories, which in turn can be connected at their exhaust sides to the passage 72 so that the total volumetric capacity of the pump need not be increased because of the presence of the additional accessories.

In FIGURES 2A and 2B, I have shown in very schematic form the basic elements of the structure shown in FIGURE 1. Similar reference characters have been used in FIGURE 2 to designate components that are found in FIGURE 1. FIGURE 2 shows in addition, however, a converter lock-up clutch 74 which is used to lock together the impeller 78 and the turbine 76 of a hydrokinetic torque converter shown generally at 80. The clutch 74 includes a clutch element 82 situated adjacent the impeller wall 84. The region between the element 82 and the wall 84 is in fluid communication with a clutch release pressure passage 86, which passes through the hub 88 of the impeller and the hub 90 of the stator 92 for the converter 80. The clutch pressure apply passage 94 communicates with internal passage 96, which in turn is in fluid communication with the interior of the torus circuit of the converter 80. If the passage 94 is pressurized and the passage 86 is exhausted, the fluid pressure within the torus circuit will cause the clutch element 82 to frictionally engage the wall 84 thereby locking the turbine to the impeller. Upon a reversal in the pressure distribution to passages 86 and 94, pressure is distributed radially outwardly between the element 82 and the wall 84. This releases the clutch 74.

The selective distribution of pressure to the passages 86 and 94 is controlled by the lock-up clutch actuator valve 98. This valve comprises a valve chamber 100 and the valve spool 102. Control pressure is distributed to the valve 98 through passage 104. When the valve spool 102 is in the position shown, communication is established between the passage 104 and the passage 94, and passage 86 is exhausted through exhaust port 106. Spool 106 is urged normally in a right-hand direction by valve spring 108.

If passage 110, which communicates with the right-hand end of the valve spool 102, is pressurized by a suitable control pressure signal, communication is established between the passage 104 and passage 86 as passage 94 becomes exhausted. In this way, the clutch 74 can be applied and released. A control signal distribution passage 110 extends from the valve body for the transmission.

Having thus described a preferred form of our invention, what we claim and desire to secure by U.S. Letters Patent is:

1. In an automatic vehicle having a torque delivery driveline including an automatic power transmission mechanism and hydrostatically operated accessories, said transmission mechanism having at least one ratio controlling fluid pressure operated servo and said hydrostatically operated accessories including a fluid feed circuit for accommodating fluid flow threrethrough, said driveline having a driving member, a positive displacement fluid pump connected drivably to said driving member, conduit structure connecting said pump with said automatic transmission, a main regulator valve means communicating with said conduit structure for maintaining a regulated pressure level in said transmission servos, a flow controlling orifice, the outlet port of said pump communicating with said orifice, said accessories being in fluid communication with the downstream side of said orifice, a control pressure passage extending to said main regulator valve means and to pressure sensitive portions of said automatic power transmission mechanism, a movable valve element in communication with the outlet port of said pump and subjected to the pressure therein, said movable valve element registering with said control pressure passage and blocking the same when the pressure in said pump is less than a predetermined value, the other side of said movable valve element being in communication with the downstream side of said control orifice, said valve element moving to an open circuit position to establish communication between said pump and said regulator valve means in response to an increase in the pressure differential across the orifice, the downstream side of said hydrostatically operated accessories communicating with the inlet side of said regulator valve means.

2. In an automotive vehicle having an automatic power transmission control system with at least one fluid pressure operated servo and hydrostatically operated accessories, a common positive displacement pump for supplying fluid pressure to said servo and to said accessories, said accessories accommodating circulation of pressurized fluid therethrough, a fluid pressure regulator valve means in communication with said servo and the downstream side of said accessories for maintaining a regulated pressure therein, a control orifice communicating on one side thereof with the discharge side of said pump, said accessories communicating with the downstream side of said control orifice, and flow responsive valve means establishing controlled communication between the discharge side of said pump and said regulator valve means including a shiftable valve element having opposed fluid pressure areas each of which communicates with a separate side of said control orifice.

3. In an automotive vehicle having an automatic power transmission control circuit and hydrostatically operated accessories, said accessories accommodating circulation of fluid therethrough, a common fluid pressure pump for developing circuit pressure for said accessories and said control circuit, a main regulator valve means for maintaining a regulated pressure level in said control cicruit, passage means for establishing fluid communication between the inlet side of said accessories and said main regulator valve means the downstream side of said accessories communicating directly with said regulator valve means whereby fluid circulating through said accessories is distributed to said control circuit.

4. The combination as set forth in claim 1 wherein the fluid communication between said main regulator valve means and the outlet side of said pump includes a valve port and a flow control valve registering with said port to normally block fluid distribution therethrough, spring means for urging said valve element to a flow-blocking position, the fluid pressure in the discharge side of said pump acting on said valve element to urge the same to an open circuit position against the opposing influence of said valve spring, the pressure on the downstream side of said control orifice acting on the other side of said valve element to supplement the action of said spring means.

5. The combination as set forth in claim 2 wherein the fluid communication between said main regulator valve means and the outlet side of said pump includes a valve port and a flow control valve registering with said port to normally block fluid distribution therethrough, spring means for urging said velve element to a flow-blocking position, the fluid pressure on the discharge side of said pump acting on said valve element to urge the same to an open circuit position against the opposing influence of said valve spring, the pressure on the downstream side of said control orifice acting on the other side of said valve element to supplement the action of said spring means.

6. The combination as set forth in claim 3 wherein the fluid communication between said main regulator valve means and the outlet side of said pump includes a valve port and a flow control valve registering with said port to normally block fluid distribution therethrough, spring means for urging said valve element to a flow-blocking position, the fluid pressure in the discharge side of said pump acting on said valve element to urge the same to an open circuit position against the opposing influence of said valve spring, the pressure on the downstream side of said control orifice acting on the other side of said valve element to supplement the action of said spring means.

References Cited
UNITED STATES PATENTS

| | | |
|---|---|---|
| 2,903,083 | 9/1959 | Kelley. |
| 2,965,202 | 12/1960 | Christenson _____ 60—54 XR |
| 3,023,579 | 3/1962 | Bookout et al. |
| 3,213,622 | 10/1965 | Liang _____ 60—54 |

EDGAR W. GEOGHEGAN, *Primary Examiner.*

U.S. Cl. X.R.

60—54